United States Patent
Tappe

(10) Patent No.: US 6,637,455 B1
(45) Date of Patent: Oct. 28, 2003

(54) PLASTIC STOP VALVE AND METHOD FOR THE PRODUCTION THEREOF

(75) Inventor: Michael W. Tappe, Dusseldorf (DE)

(73) Assignee: Figa-Hybrid AG, Dusseldorf (DE)

( * ) Notice: Subject to any disclaimer, the term of this patent is extended or adjusted under 35 U.S.C. 154(b) by 0 days.

(21) Appl. No.: 09/830,034

(22) PCT Filed: Oct. 20, 1999

(86) PCT No.: PCT/EP99/07964
§ 371 (c)(1),
(2), (4) Date: Jun. 11, 2001

(87) PCT Pub. No.: WO00/23738
PCT Pub. Date: Apr. 27, 2000

(30) Foreign Application Priority Data

| Oct. 20, 1998 | (DE) | 198 48 339 |
| Sep. 24, 1999 | (DE) | 199 45 960 |

(51) Int. Cl.[7] ................................ F16L 7/00
(52) U.S. Cl. .................... 137/375; 251/315; 251/366
(58) Field of Search ................ 137/375; 251/172, 251/315, 366

(56) References Cited

U.S. PATENT DOCUMENTS 4,172,583 A * 10/1979 Wrasman ............... 251/172
4,553,562 A * 11/1985 Nakada ................. 137/375

FOREIGN PATENT DOCUMENTS

| DE | 4442979 A1 | 12/1994 |
| EP | 0575643 A1 | 6/1992 |

* cited by examiner

Primary Examiner—Gene Mancene
Assistant Examiner—M A Cartagena
(74) Attorney, Agent, or Firm—Woodbridge & Associates, PC; Richard C. Woodbridge; Thomas J. Onka

(57) ABSTRACT

A method for the production of a stop valve for pipes, with a housing which consists of plastic, has two pipe connectors and in which a blocking element, which can be adjusted by an actuation unit between a flow position and a blocking position, is mounted at least by means of bearing rings and seals. This method includes injecting plastic around the inner part, which comprises the blocking element as well as the bearing and sealing rings, in the pre-assembled state with the use of an adhesion means to form the housing.

5 Claims, 1 Drawing Sheet

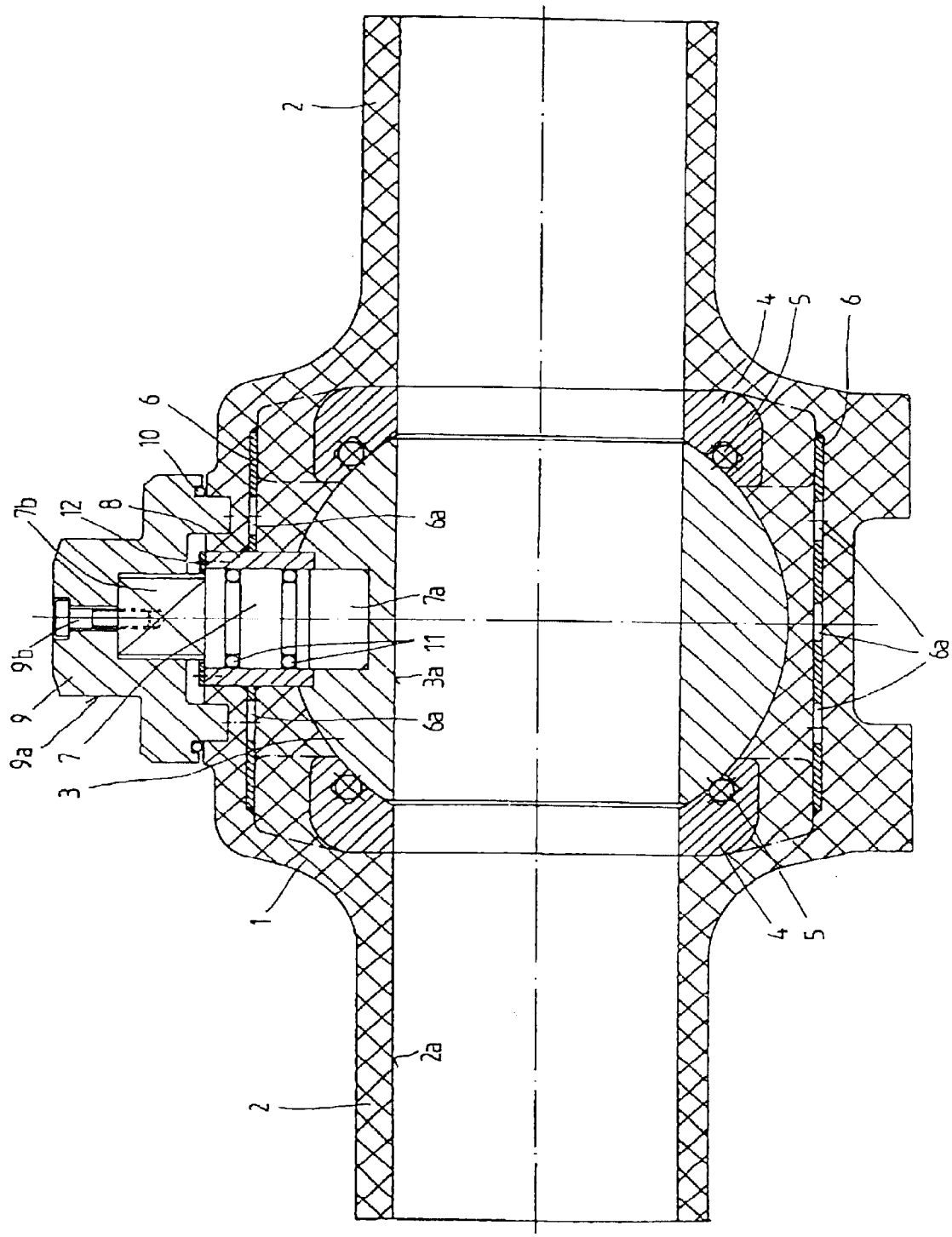

PLASTIC STOP VALVE AND METHOD FOR THE PRODUCTION THEREOF

BACKGROUND OF THE INVENTION

1. Field of the Invention

This invention relates to a method for the production of a stop valve for pipes, with a housing which consists of plastic, has two pipe connectors and in which a blocking element, which can be adjusted by an actuation unit between a flow position and a blocking position, is mounted at least by means of bearing rings and seals, wherein plastic is injected around the inner part, which comprises the blocking element as well as the bearing and sealing rings, in the pre-assembled state with the use of an adhesion means to form the housing. The invention also relates to a stop valve produced by this method.

2. Description of Related Art

A method for the production of a stop valve is known, for example, from DE 44 42 979 A1. In this known method, a plastic covering is firstly injected around the ball as well as part of the operating shaft and the lower part of the journal in a first method step. In a subsequent working step, an elastic insert is arranged on the outside of the plastic covering produced in the first sep, between the flange regions and, in the subsequent working step, the valve housing is injected using plastic onto the covering provided with the elastic insert. This method for the production of a plastic housing for a stop valve is very expensive, since a completely two-part valve housing needs to be produced from plastic. The elastic insert which is used is intended to provide separation between the inner covering and the outer valve housing whereas, outside the region of the elastic insert, the two plastics of the inner covering and of the outer valve housing are materially interlocked. In particular owing to the design of the completely two-part valve housing, consisting of the inner covering and the outer valve housing, this known method can scarcely be regarded as economical.

Another method for the production of a ball valve with a housing consisting of plastic is known from EP-0 575 643-B1. To make the plastic housing in this known method, the pre-assembled inner part in the pre-assembled state is placed in an injection mould which creates the outer shape of the housing and the flow cross section of the pipe connectors, then plastic is injected around it. This way of producing the plastic housing, in which the complete valve is divided into an outer part and an inner part, has proved very successful in practice. By virtue of the division into the pre-assembled inner part and the outer part which is to be injected on, the two housing parts are forced to contract relative to each other as the housing made in the injection mould cools, and radically inward shrinkage of the housing, which would entail jamming of the valve ball in the housing, is prevented.

Especially when a stop valve produced in this way is used with pipes having a large diameter of the pipe connectors, and with high feed pressures in the pipes, especially when used as a gas stop valve, it can be found in practice that leakage occurs at the stop valve, even though the stop valve is shut, because the medium to be blocked infiltrates through between the inner part and the outer part, i.e. between the outside of the blocking element as well as the mounting and sealing rings and the inside of the plastic housing. It is absolutely necessary to avoid such leaks, in particular when the fitments are used to block gas lines.

DESCRIPTION OF THE PREFERRED EMBODIMENT

On the basis of this, it is an object of the invention to improve a method for the production of a stop valve for pipes, with a housing which consists of plastic, so that none of the medium to be blocked can enter between the inner part and the outer part of the valve and which furthermore, is simple and inexpensive to carry out. It is another object of the invention to provide a stop valve produced by this method.

The solution to this object for the method is characterized by the method steps:

a) making a moulding, which corresponds essentially to the outer shape of the insert and to the inner shape of the housing in the region of the insert, from a plastic by means of injection moulding;

b) injecting the plastic, which constitutes the insert, onto and into the moulding made in the method step a) while simultaneously forming a welded bond between the plastic of the moulding and the material of the insert;

c) assembling the stop-valve inner part which consists of the valve ball, the bearing rings, the sealing rings, the bearing collar and the insert together with the moulding, and d) injecting plastic around the inner part pre-assembled in the method step c) while simultaneously forming a welded bond between the plastic of the moulding, which at least partially constitutes the inner shape of the housing, and the material of the housing.

The method according to the invention is distinguished in that the adhesion means, which is used to connect the inner part and the outer part of the stop valve, simultaneously serves as moulding for the outer shape of the insert and the inner shape of the housing in the region of the insert. The plastic moulding produced in the first method step is partially melted, during the subsequent injection around or on to form the insert and the valve housing, by the plastic injected on in each case, so as to create a materially interlocked welded bond between the moulding and the insert, on the one hand, and the moulding and the valve housing, on the other hand, This materially interlocked bond between the inner part and the inside of the housing (the outer part) ensures that the leakages described in the prior art are avoided.

According to a practical embodiment of the invention, a thermoplastic is used as the plastic for the moulding. Thermoplastics have, in this regard, the advantage that the heat released when plastic is injected around the inner part converts them into a plasticized and flowable state, so that they fit very well to the outer contours of the inner part and the inner contours of the outer part, and a weld is induced between them.

According to a preferred embodiment of the invention, an adhesion copolymer is used as the plastic for the moulding. Adhesion copolymers are distinguished in that, with appropriate formulation, they bond very well to other plastics, especially polyethylene, and that when a plastic is injected directly onto an adhesion copolymer, the latter partially melts and the welded bond is formed between the two plastics. Since polyethylene is preferably used as the plastic for the valve housing, adhesion copolymers are indeed highly suitable as the adhesion means.

The stop valve for pipes according to the invention, which is produced by the method described above, is characterized in that the inner part and the housing (outer part) are materially interlocked at least partially via a moulding injection-moulded from a plastic. The materially interlocked bond according to the invention between the inner part of the stop valve and the stop-valve outer part constituting the plastic housing makes it possible, for the first time, to counteract internal leakage of the stop valve which involves the medium blocked by the stop valve entering between the outside of the inner part and the inside of the outer part. In addition, the statics of the overall valve are, durably improved by the materially interlocked bond of the inner part and the plastic covering.

Lastly, the invention proposes that, in the case of a stop valve according to the invention with an insert connecting the bearing rings to one another, a plurality of penetrations are formed in the insert, so as to provide additional anchoring points for a geometrically interlocked bond between the housing (outer part) and the inner part. When the injected moulding used as the adhesion means melts, it enters the penetrations of the insert and hence interlocks geometrically in the insert. Besides the materially interlocked bond due to the welding, a geometrically interlocked bond is hence additionally provided.

Other features and an advantage of the invention can be found in the following description of the appended drawing, in which a longitudinal section through a ball valve is represented by way of example.

BRIEF DESCRIPTION OF THE DRAWING

FIG. 1 illustrates the stop ball valve according to the preferred embodiment of the invention.

The ball valve represented in the exemplary embodiment comprises a housing 1 made of plastic, preferably polyethylene, on which two connectors 2 pointing in opposite directions are integrally formed. These pipe connectors 2 are used for connecting the ball valve to a line (not shown in the drawing) which is likewise made of plastic. The housing 1 may also be provided with screw flanges on the end of the pipe connectors 2.

A valve ball 3 serving as a blocking element is arranged inside the housing 1, and is provided with a flow bore 3a which corresponds to the flow cross section 2a of the pipe connectors 2. The valve ball 3 is mounted by means of two bearing rings 4, which are each provided with a sealing ring 5 to seal them from the valve ball 3.

The bearing rings 4 are furthermore connected to one another on the remaining circumferential surface by an annular insert 6. This connection can, for example, be made by adhesive bonding or by welding. Welded seams are shown by way of example in the FIGURE.

In order to make it possible to turn the valve ball 3, shown in the open position in the FIGURE, to throttle or to close the flow cross section 2a, an operating shaft 7, which is mounted so that it can rotate in a bearing collar 8, is arranged in the housing 1. The operating shaft 7 engages by means of a coupling piece 7a in a corresponding recess of the valve ball 3, so that this valve ball 3 can be turned between a flow position and a blocking position by means of the operating shaft 7. To that end, a square 7b or polygon is formed on the outwardly lying end of the operating shaft 7. Besides this represented driving mechanism for the valve ball, a wide variety of actuation units are possible for operating the blocking elements. For instance, it is also possible to adjust the blocking elements, which are designed as valve balls or wedge plates, in automated fashion using electrical, pneumatic or hydraulic drives. In the exemplary embodiment which is represented, an operating head 9 designed with key surfaces 9a is fitted onto the square 7b of the operating shaft 7, and is fastened to the operating shaft 7 by a screw 9b so that it cannot rotate. The end of the operating head 9 which protrudes into the housing 1 can rotate relative to the housing 1 and is additionally sealed therefrom by a seal 10.

The bearing collar 8 for mounting the operating shaft 7 is arranged in a corresponding recess of the annular insert 6. In the exemplary embodiment which is represented, the bearing collar 8 and the insert 6 are welded to each other. To seal the operating shaft 7 from the bearing collar 8, two ring seals 11 are provided in the exemplary embodiment.

Depending on the intended use, the bearing rings 4, the valve ball 3, the insert 6 and the bearing collar 8 may be produced from red brass, brass, stainless steel or plastic, preferably glass fibre-reinforced plastic or polypropylene. It is also possible to use different materials or material combinations for the parts listed above, so long as it is ensured that the parts can be connected to one another. Nitrile-butyl rubber is preferably used for the sealing rings 5 and the ring seals 11 as well as the seal 10. The operating shaft 7 can likewise be produced from a suitable material, for example red brass, brass, stainless steel or plastic.

To produce the ball valve represented in the FIGURE, a moulding, which corresponds essentially to the outer shape of the insert 6 and to the inner shape of the housing 1 in the region of the insert 6, is produced in a first method step by means of injection moulding from a plastic, advantageously an adhesion copolymer. The plastic, which constitutes the annular insert 6, is then injected onto and into the moulding produced in the previous method step, so that when adhesion copolymers are used to form the moulding, these become partially melted and a welded bond is formed between the plastic of the moulding and the material of the annular insert 6 during the injection process to form the annular insert 6.

The bearing collar 8 is subsequently fastened to the insert 6 produced in this way. The bearing rings 4 provided with the sealing rings 5 are subsequently fitted onto the valve ball 3 and connected to one another by means of the annular insert 6.

In this pre-assembled state, the parts forming the inner part of the stop valve, namely the valve ball 3, the bearing ring 4, the sealing rings 5, the bearing collar 8 and the annular insert 6, together with the moulding of the plastic used as an adhesion means, are placed in an injection mould (not shown in the drawing) which create the outer shape of the housing 1 and plastic, preferably polyethylene, is injected around them. During this renewed injection process, the material of the moulding used as an inner shape for the housing becomes melted again, so that a welded bond is also formed between the plastic of the housing 1 and the plastic of the moulding. So that the plastic of the housing 1 can reach in the radial direction as far as the valve ball 3, a plurality of penetrations 6a are provided in the insert 6.

Arranging the insert 6, which connects the bearing rings 5 to one another and carries the bearing collar 8 for the operating shaft 7, inside the housing 1 made in the injection mould leads, so to speak, to division of the valve into an outer part constituting the hosing 1 and an inner part which is enclosed by the housing 1, even though a monobloc housing with integrally formed pipe connectors 2 is obtained in the injection mould.

Using the moulding, which consists of a plastic, to form the outer contour of the annular insert 6 and the inner contour of the housing 1 in the region of the annular insert 6 leads to a materially-interlocking sealed bond between the inner part and the inner parts of the housing 1 constituting the other part, so that entry of the medium to be blocked between the inner part and the inside of the outer part is prevented.

After the above-described production of the plastic housing 1, which is formed integrally with the pipe connectors 2, the operating shaft 7 with its ring seals 11 is fitted into the bearing collar 8 so that its coupling piece 7a engages into the corresponding recess of the valve ball 3. A bearing ring 12 is subsequently screwed onto the outwardly lying end face of the bearing collar 8 and, because of the shoulder formed between the square 7b and the central piece of the operating shaft 7, prevents the operating shaft 7 from escaping out of the bearing collar 8. In the exemplary embodiment, lastly, the operating head 9 is fitted onto the square 7b of the operating shaft 7 and is fastened by means of the crew 9b. The ball valve is ready for use and can be fitted, via the end faces of its two pipe connectors 2, into the respective plastic line, especially a gas supply line.

In the exemplary embodiment which is represented, as can be seen from the FIGURE, a ball valve is obtained with a monobloc plastic housing 1 and a flow bore 3a, in the valve ball 3, which corresponds to the flow cross section 2a of the pipe connectors 2, so that no throttling losses occur inside the ball valve when it is open. The materially interlocked bond between the parts 3, 4, 5, 6 and 8 forming the inner part as well as the plastic of the housing 1 eliminates the risk of sealing defects due to the possibility that the medium to be sealed off might enter between the inner part and the outer part. This insures that, even when the medium to be blocked is at high pressures, genuinely leak-free internal sealing is guaranteed by a stop valve produced in this way.

LIST OF REFERENCES

1 housing
2 pipe connectors
2a flow cross section
3 valve ball, blocking element
3a flow bore
4 bearing ring
5 sealing ring
6 insert
6a penetration
7 operating shaft
7a coupling piece
7b square
8 bearing collar
9 operating head
9a key surface
9b screw
11 ring seal
12 bearing ring

What is claimed is:

1. Method for the production of a stop valve for pipes, with a housing (1) which consists of plastic, has two pipe connectors (2) and in which a blocking element (3), which can be adjusted by an actuation unit between a flow position and a blocking position, is mounted at least by means of bearing rings (4) and sealing rings (5), wherein plastic is injected around an inner part, which comprises the blocking element (3), the bearing and sealing rings (4, 5), a bearing collar (8) and an insert (6), in the pre-assembled state with the use of an adhesion means to form the housing, said housing having an inner shape, said method comprising the steps of:

a) making a molding, which corresponds essentially to the outer shape of the insert (6) and to the inner shape of the housing (1) in the region of the insert (6), from a plastic by means of injection molding;

b) injecting a plastic, which constitutes the insert (6), onto and into the molding made in the method step a) while simultaneously forming a fusion-welded connection between the plastic of the molding and the material of the insert (6);

c) assembling the stop-valve inner part which consists of the blocking element (3), the bearing rings (4), the sealing rings (5), the bearing collar (8) and the insert (6) (together with the molding), and placing the inner part in an injection mold;

d) injecting plastic free of clearance volume around the inner part pre-assembled in the method step c) while simultaneously forming a fusion-welded connection between the plastic of the molding and the material of the housing (1).

2. Method according to claim 1, characterized in that the plastic for making the molding in method step a) is a thermoplastic.

3. Method according to claim 1, characterized in that the plastic for making the molding in method step a) is an adhesion copolymer.

4. Stop valve for pipes, produced by the method according to claim 1, characterized in that the inner part and the housing (1), which forms the outer part, are materially interlocked at least partially in the region of the insert (6).

5. Stop valve according to claim 4 with an insert (6) connecting the bearing rings (4) to one another, characterized in that a plurality of penetrations (6a) are formed in the insert (6) and the injected molding, so as to provide additional anchoring points for the materially interlocked connection between the housing (1) (outer part) and the inner part.

* * * * *